United States Patent [19]

Miller et al.

[11] Patent Number: 5,403,809
[45] Date of Patent: Apr. 4, 1995

[54] COMPOSITE INORGANIC SUPPORTS CONTAINING CARBON FOR BIOREMEDIATION

[75] Inventors: James G. Miller, Ellicott City; Michael J. Wax, Bethesda; Alan B. Chmurny, Frederick; Donald R. Durham, Gaithersburg, all of Md.

[73] Assignee: W. R. Grace & Co.-Conn., New York, N.Y.

[21] Appl. No.: 993,745

[22] Filed: Dec. 21, 1992

[51] Int. Cl.⁶ ............................................. B01J 20/20
[52] U.S. Cl. .................................. 502/413; 502/416; 502/423; 502/429
[58] Field of Search .............. 502/413, 416, 423, 429

[56] References Cited

U.S. PATENT DOCUMENTS

| | | |
|---|---|---|
| 3,957,689 | 5/1976 | Ostermaier et al. |
| 4,499,208 | 2/1985 | Fuderer .......................... 502/413 |
| 4,793,837 | 12/1988 | Pontius ........................... 502/413 |
| 4,954,469 | 9/1990 | Robinson ........................ 502/413 |
| 4,963,519 | 10/1990 | Okabayashi et al. ............ 502/413 |

FOREIGN PATENT DOCUMENTS

| | | | |
|---|---|---|---|
| 967136 | 5/1975 | Canada. | |
| 492879 | 7/1992 | European Pat. Off. ........... 585/413 |

OTHER PUBLICATIONS

R. F. Hickey, D. Wagner and G. Mazewsi, "Combined Biological Fluid Bed-Carbon Adsorption System for BTEX Contaminated Ground-water Remidiation," presented at 4th National Outdoor Action Conference on Aquifer Restoration, Groundwater Monitoring & Geophysical Methods, Las Vegas, Nev., May, 1990.

R. W. Soffel in "Carbon (Carbon and Artifical Graphite)" in the Kirk Othmer Encyclopedia of Chemical Technology, 3rd edition, vol. 4, 1978.

R. S. Joyce in "Carbon, Activated" in the Encyclopedia of Chemical Processing and Design, 1978.

Chemie-Ingenieur-Technik, vol. 63, pp. 1238-1240, 1991.

Beckman & Hegedus in "Design of Monolith Catalysts for Power Plant Nox Emission Control," in Industrial & Engineering Chemistry Research, vol. 29, pp. 969-978, 1991.

*Primary Examiner*—Asok Pal
*Attorney, Agent, or Firm*—Beverly J. Artale

[57] ABSTRACT

Porous bodies are produced which are suitable for use as supports for catalysts, including living cells, such as bacteria and which are upset resistant to acids and bases. The bodies have a significantly large average pore diameter of about 0.5 to 100 microns, (i.e. 5,000 to 1,000,000 Å) and a total pore volume of about 0.1 to 1.5 cc/g with the large pores contributing a pore volume of from about 0.1 to 1.0 cc/g. The bodies are made by preparing a mixture of ultimate particles containing a zeolite and one or more optional ingredients such as inorganic binders, extrusion or forming aids, burnout agents, or a forming liquid, such as water. Incorporated into the support is activated carbon which provides improved properties. In a preferred embodiment, the ultimate particles are formed by spray drying.

9 Claims, 2 Drawing Sheets

COMPOSITE INORGANIC SUPPORTS CONTAINING CARBON FOR BIOREMEDIATION

CROSS REFERENCE TO RELATED APPLICATIONS

U.S. Ser. No. 07/994,222 filed Dec. 21, 1992, relates to clay based supports for bioremediation.

U.S. Ser. No. 07/997,261 filed Dec. 21, 1992, relates to zeolite containing inorganic supports for bioremediation.

BACKGROUND OF THE INVENTION

1. Field of the Invention
2. Description of Prior Art

Biological treatment is a useful method for the destruction of organic compounds in groundwater and wastewater. Bacteria or other microorganisms which are effective for biological treatment may be used in free suspensions, or alternatively in biofilms fixed on solid supports. Use of solid supports typically reduces both cell washout (in flow systems) and sludge formation, and may enhance biological treatment in other ways. Supports which have non-biological (e.g., adsorptive or catalytic) functions may afford expanded capabilities for wastewater or groundwater treatment.

Activated carbon is a common support for bacteria and other microorganisms to be used in the biological treatment of contaminated water. (By "activated carbon" is meant any porous, high surface area form of carbon.) For example, [R. F. Hickey, D. Wagner, and G. Mazewsi, "Combined Biological Fluid Bed-Carbon Adsorption System for BTEX Contaminated Groundwater Remediation," presented at the Fourth National Outdoor Action Conference on Aquifer Restoration, Groundwater Monitoring and Geophysical Methods, Las Vegas, Nev., May, 1990] teaches the use of biofilms on granular activated carbon for the degradation of benzene and alkylbenzenes in groundwater. The ability of activated carbon to adsorb organics from water enhances its utility as a support. Thus, when organics are too dilute to serve as a carbon source for bacteria or other microorganisms, they may be concentrated on the carbon to a level where they can be degraded. Further, carbon can protect the biofilm in a bed from transient toxic levels of organics (shocks) by adsorbing these, and later slowly releasing the organics at much lower levels. Even if substantially all of the bacteria or other microorganisms in a bed are killed by a shock, the carbon support will adsorb pollutants while the carbon is being recolonized, and so prevent even temporary breakthrough of the pollutants.

Activated carbon has a number of deficiencies which militate against its use. First, carbon typically is not mechanically strong, and so is broken up easily during handling or fluidization. Second, carbon is very light, and is difficult to keep in fluidized beds. A third disadvantage of activated carbon is that it is microporous, and typically has very few, if any, macropores. Biofilms thus may be formed only on the external surfaces of carbon particles, while potentially higher biomass loadings are possible on materials which have pores large enough to contain bacteria and other microorganisms. Finally, activated carbon by its nature has particular surface chemical properties. For some applications, other surface chemistries may be desired, e.g., some bacteria may prefer to colonize more hydrophobic surfaces than that of carbon.

Many non-carbonaceous materials also have been used to support biofilms. In this category are solid inorganic oxides, which may have a number of advantages over activated carbon. These include good mechanical strength and attrition resistance, densities suitable for use in fluidized beds, the ability to tailor surface chemical and physical properties by the choice of oxide, the ability to add other properties, such as buffering or ion exchange, and the possibility of having pores with diameters large enough to permit microbial colonization. This last property offers the possibility of establishing cell densities (cells/unit volume) much higher than those available in materials such as carbon in which only the external geometric surface area is available for biocolonization. Our co-pending applications U.S. Ser. No. 994,222, filed Dec. 21, 1992, and U.S. Ser. No. 997,261 filed Dec. 21, 1992, the contents of which are incorporated here by reference, describe the preparation and use for bioremediation of clay-based supports with micron-sized pores.

Despite these advantages, most inorganic materials will not have the spectacular ability of activated carbon to adsorb organic compounds. As was noted above, this ability greatly enhances the efficacy of biofilms supported on carbon for biological treatment of aqueous streams.

Thus, existing supports, composed either of carbon or of inorganic oxide materials, have one or more deficiencies for use in biotreatment. Supports which possess the best properties of both are desired. These properties include the adsorptive capacity of carbon and the strength, density, potential large pore diameters, and tailorable chemistry, e.g. buffering capacity, of the other inorganic materials. These supports further should be easily prepared.

OBJECTS OF THE INVENTION

It is an object of this invention to provide a porous support for bacteria and other microorganisms, as well as a process for its preparation.

It is a further object of this invention to provide a porous support which has pores large enough for colonization by bacteria and other microorganisms.

It is a further object of this invention to provide a porous support for bacteria and other microorganisms which provides resistance against process upsets.

It is a further object of this invention to provide a porous, activated carbon-inorganic oxide composite support.

These and other objects of the current invention will become obvious as the description below proceeds.

SUMMARY OF THE INVENTION

Composite inorganic porous bodies are produced which are suitable for use as supports for biofilms. These bodies comprise an inorganic oxide component and an activated carbon component, and have a group of large pores with an average pore diameter of about 0.5 to 100 μm, (i.e. 5,000 to 1,000,000 Å) and a pore volume of about 0.1 to 0.5 cc/g. The activated carbon can be present as particulate material dispersed throughout the support. The porous bodies may be produce according to any of three methods, the choice of which will depend upon the particular application. In the first method, the bodies are made by preparing a mixture of:

(a) ultimate particles, comprising an inorganic oxide or mixtures of inorganic oxides and optional inorganic binder components and/or other functional components, with a Davison Index of less than about 20;
(b) activated carbon particles;
(c) one or more optional inorganic binders, such as peptized alumina;
(d) one or more optional extrusion or forming aids;
(e) an optional liquid, typically water.

In a preferred embodiment, the ultimate particles are formed by spray drying. The mixture of ultimate particles and other ingredients is formed into bodies through extrusion, pelletization, balling, or other suitable process, and these bodies then are dried and calcined either under an oxygen-deficient atmosphere and/or at low temperature in order to avoid loss of the activated carbon component by combustion.

A second method for producing the porous bodies requires preparation of a mixture of:
(a) ultimate particles, comprising an inorganic oxide or mixtures of inorganic oxides and optional inorganic binder components and/or other functional components, with a Davison Index of less than about 20;
(b) one or more organic compounds which may be converted to activated carbon by charring;
(c) one or more optional inorganic binders, such as peptized alumina;
(d) one or more optional extrusion or forming aids;
(e) an optional liquid, typically water.

In a preferred embodiment, the ultimate particles are formed by spray drying. The mixture of ultimate particles and other ingredients is formed into bodies through extrusion, pelletization, balling, or other suitable process, and these bodies then are dried and calcined under an oxygen-deficient atmosphere and/or at low temperature to convert the organic compounds in the forming mixture to activated carbon.

A third method of producing the composite porous bodies involve preparation of non-carbon-containing porous bodies, impregnation of these with one or more organic compounds which may be converted to activated carbon by charring, and drying and calcination of the impregnated bodies. Thus, the bodies are made by preparing a mixture of:
(a) ultimate particles, comprising an inorganic oxide or mixtures of inorganic oxides and optional inorganic binder components and/or other functional components, with a Davison Index of less than about 20;
(b) one or more optional inorganic binders, such as peptized alumina;
(c) one or more optional extrusion or forming aids;
(d) one or more optional burnout agents; and,
(e) an optional liquid, typically water.

In a preferred embodiment, the ultimate particles are formed by spray drying. The mixture of ultimate particles and other ingredients is formed into bodies through extrusion, pelletization, balling, or other suitable process, and these bodies then are dried and calcined. The finished bodies next are impregnated with a solution of one or more organic compounds which may be converted to activated carbon by charring, and finally are dried and then calcined under an oxygen-deficient atmosphere and/or at low temperature to provide an activated carbon coating on the surface of the ultimate particles in the previously formed support.

In all of these methods the preferred inorganic oxide in the ultimate particle is a substantial amount of a zeolite.

In addition to use as supports for biofilms, the porous bodies also may be useful as catalyst supports, as adsorbents, or in filtration devices.

DETAILED DESCRIPTION OF THE INVENTION

Carbon-inorganic oxide composite porous bodies suitable for use as supports for biofilms are produced by any of three methods. All three have in common preparation of a preferred zeolite containing mixture, forming of this mixture into porous bodies, and drying and calcination of the bodies. Where the methods differ is in the route through which activated carbon is incorporated into the bodies to form a composite.

According to the first method, a mixture of inorganic oxide bodies preferably a zeolite and activated carbon particles, along with other, optional ingredients, is extruded or otherwise formed into bodies. This method has the advantage that the properties of the activated carbon in the composite may be specified in advance. Additionally, the components of the support should retain distinct identities, with separate regions of both unmodified oxide and activated carbon accessible through the pores of the support.

In the second method, a mixture of zeolite particles, one or more organic compounds which may be converted to activated carbon by charring, and other, optional ingredients is formed into bodies, which then are calcined to convert the organic compound(s) into activated carbon. This method may allow the carbon to be more uniformly dispersed throughout the support on a microscopic scale than does the use of pre-formed activated carbon particles. In some cases, this method may have the virtue of efficiency, in that the organic compounds which are the precursors to activated carbon also may serve as extrusion or forming aids.

Finally, the third method for preparing porous carbon-inorganic oxide supports requires initial formation of inorganic oxide bodies, impregnation of these bodies with a solution of one or more organic compounds which may be converted to activated carbon by charring, and then calcination to convert the organic compound(s) into activated carbon. This method allows separate optimization of the properties of the (carbon-free) inorganic support. Its distinct utility lies in the possibility of forming a continuous cladding of activated carbon on the inorganic oxide, with consequent complete modification of its surface properties. (In contrast to this, the first two methods should leave exposed surface regions of both inorganic oxide and activated carbon.)

Following is a discussion of the process for forming carbon-inorganic oxide composite porous bodies. This discussion begins with the common elements in the 5 different three methods, i.e., those things necessary for the preparation of porous inorganic oxide supports, and then finishes with the variable elements of the methods, which cover the routes to incorporation of carbon into the composites.

By varying the components in the preparation mixture, the physical properties of the finished bodies can be altered. Preferably, the finished bodies will have an average pore diameter of 0.5 to 100 μm, although the exact choice of pore diameter will depend upon the application. If, for example, rapid gaseous diffusion into the body is most important or the catalytic species is very large, a larger pore diameter will be desired. If, as a counter example, maximum surface area is necessary for catalytic activity, then a smaller pore diameter will be most appropriate, surface area being linearly related to pore diameter at constant pore volume.

The pore volume of the finished bodies also will vary with the intended application, but will range from about 0.1 to 1.5 cc/g. Pore volume in pores with diameters ranging from 0.5 to 100 μm will range from about 0.1 to 1.0 cc/g. Increased pore volumes correspond to higher surface areas (at constant pore diameter) and provide more space in which large catalyst species may reside, but also typically result in decreased crush strengths.

Porous body size and shape will be dictated by the circumstances of use. Typical shapes include spheres, cylinders, rings, and honeycombs. Typical formed products have a diameter of at least 250 microns. Preferred combinations of size and shape are spheres or cylinders of up to 1 cm for fluidized beds; spheres, cylinders, or rings of from 1 mm to 5 cm for fixed beds; and square monoliths up to 1 m long for high space velocity applications.

In order to prevent destruction of the bodies during shipping or use, these should have reasonable mechanical strengths. For bodies with minimum dimensions of about 1 mm, this requirement corresponds to crush strengths greater than about five pounds, as measured using a testing machine such as the Pfizer Hardness Tester Model TM141-33, manufactured by Charles Pfizer and Co., Inc. 630 Flushing Avenue, Brooklyn, N.Y. The porous bodies are placed between two parallel plates of the machine and plates are slowly brought together by hand pressure. The amount of force required to crush the particle is registered on a dial which has been calibrated in pounds force. A sufficient number (for example, 50) of particles is crushed in order to get a statistically significant estimate for the total population. The average is calculated from the individual results. Higher crush strengths may be desirable in demanding applications. Further, for use in fluidized beds or to prevent losses during filling fixed beds, good attrition resistance is desired.

For these large size particles they should have an attrition of less than 20%, and preferably less than 10% attrition. The attrition loss test involves selecting a set volume (60 cc.) of material to be tested which is placed in an inverted Erlenmeyer flask of special construction which is connected to a metal orifice inlet. A large (one inch) outlet covered with 14-mesh screening is located on the flat side (bottom) of the flask. High velocity dry nitrogen gas is passed through the inlet orifice causing the particles to: (1) circulate over one another thus causing attrition, and (2) impact themselves in the top section of the flask thus breaking down as a function of strength. The material is tested for five minutes and the remaining particles are weighed. The loss in weight after testing expressed as percent of the initial charge is designated the attrition loss.

The nitrogen flow will be in the range of about 3.5 and 4.0 cubic feet per minute, depending upon the density of the material. The flow rate must be sufficient for the particles to strike the top section of the flask. The fines produced by attrition are carried out of the flask by the nitrogen flow thus causing a loss in weight of the original material charged.

The ultimate particles which are used to form porous bodies are composed of a zeolite and a combination of any of a number of optional ingredients such as clay. By clay is meant any of the class of natural or synthetic hydrated aluminosilicates, with a general composition of $(Al_2O_3)_n(SiO_2)_m \cdot xH_2O$, although other elements also may be present. These aluminosilicates may be amorphous or crystalline with low ion exchange capacity. In a preferred embodiment, the clay is a natural clay such as kaolin. The amount of zeolite present in the ultimate particles will range from 50 to 100%, and more preferably from 75 to 100%.

Optional ingredients in the ultimate particles include inorganic binders, zeolites, and other functional materials. Binders serve the function of holding the particles together if the clay is available only as a very finely divided powder, or if the particles do not have good structural integrity. Binders include metal salts, oxides, and hydroxides, and their precursors and reaction products, as well as other materials, and the choice of binder will depend upon the clay used and the manner by which it has been processed into particles. Similarly, the amount of binder necessary, if any, will be a function of the clay. When the clay is kaolin, preferred binders are silica, silicic acid, sodium silicate, alumina, aluminum chlorohydrol, and aluminum sulfate. These binders will be present in amounts ranging from 0 to 50% and more preferably from 0 to 25%.

Zeolites may be present in the particles to serve one of several functions. Primary among these is buffering aqueous or other liquid streams contacting the finished catalyst. Zeolites typically have high cation exchange capacities, and will contain a variety of cations in their exchange sites at neutral pH. Upon contact with a surge of acid, the zeolite in a bed of catalyst will take up protons and release other cations, thus resisting changes in the acidity of the medium. An analogous process, e.g., exchange of sodium ions into the zeolite with release of protons on exposure to caustic, also should help to prevent excursions to high pH. See related case U.S. Ser. No. 997,261 filed Dec. 21, 1992 which further describes the advantage of zeolites and the entire contents of which is incorporated herein by reference.

Zeolites further may act as sorbents, and so remove undesired components from the stream contacting the catalyst. Such components could include water from a gas stream (removed through adsorption or absorption), or heavy metal ions from an aqueous stream (removed through ion exchange). Finally, the zeolites may act as catalysts, catalyzing, for example, fluid catalytic cracking or other acid-catalyzed reaction without the need for impregnation or loading with other catalyst species.

Of course, it will be recognized that as other materials may confer similar benefits to those of the zeolites, it is within the scope of this invention to use such materials. These include inorganic solids with ion exchange or sorption capabilities. For examples, zirconium phosphates are well-known for their ion exchange capacities, and so may be used here.

The amount of zeolite to be used may vary over a wide range, depending upon the function to be imparted, and the relative costs of the ingredients used. In one embodiment, the clay component of the particles would be zeolite, so that the amount of zeolite would be 100%.

Other functional materials which optionally may be added to the ultimate particles include catalysts and reagents, either singly or in combination. These functional particles will be present in amounts ranging from 0 to 50%. Incorporation of catalyst into the ultimate particles may eliminate the need for a step to introduce catalyst to the bodies after they are formed. Alternatively, catalytic species in the ultimate particles may serve different functions than catalytic species in the pores between particles. Catalysts typically will be in the form of metals or metal oxides.

Optional reagents in the ultimate particles may serve any of a number of functions. These may include, but are not limited to, allowing the porous body to function as a reagent, augmenting the function of a catalytic species for which the porous body is a support, preventing microbial or fungal growth, and increasing the strength of the body. Examples of reagents are oxidants, e.g., perborate, nutrients which might enhance the growth of bacteria to be used as catalysts, and biocides if such growth is to be prevented.

The ultimate particles may be formed by any suitable method which confers upon them the requisite physical integrity, as described below. In a preferred embodiment, the particles are produced by spray drying an aqueous mixture of the clay and any optional components. This route is illustrated well by U.S. Pat. No. 3,957,689 and Canadian Patent 967,136. The quantity of ultimate particles to be used will range from about 50 to 100%, and preferably from about 75 to 100%, of the total weight of the mixture used to form the porous bodies prior to the addition of any optional liquids.

Porosity is introduced to the bodies during their assembly from the ultimate particles. It is believed that the spaces between the starting particles are the pores in the finished bodies. By changing the diameters of the ultimate particles, it is possible to change the diameters of the pores. In fact, the particle size necessary to achieve a given pore size may be estimated as follows:

$$D = \frac{3d}{2\sqrt{3} - 3},$$

where D is the particle diameter, and d is the pore diameter. This model assumes monodisperse, close-packed spherical particles. Similar relationships can be derived using other arrangements of particles of alternate shape and non-uniform size. Based upon this reasoning, ultimate particles of about 1 to 1000 $\mu$m diameter are preferred.

A key aspect of this invention is the use of ultimate clay particles with sufficient physical integrity (mechanical strength and attrition resistance) to survive the forces generated in extrusion and other forming methods. If the ultimate particles do not possess the requisite physical integrity, they will be crushed, deformed, or attrited during the forming processes, with the result that the loose material will fill the interparticle spaces in the support. Thus, there will be little porosity in supports formed from soft or weak particles.

A useful measure of the physical integrity is the Davison Index for attrition for very small particles. This is determined using an Amico roller particle size analyzer fitted with a one inch (i.d.) jet cup with a 0.0625 inch orifice. In a 60 minute test at an air flow rate of 21 liters per minute on a 20+$\mu$m sample, the Davison Index value is equal to the percentage of 0 to 20 micron-sized material formed as a fraction of the original sample. According to this measure, the ultimate clay particles of the current invention should have maximum Davison Index values of about 20. Preferably, these values will be less than 10 and, most preferably, less than 5.

Other optional ingredients in the mixture which is to be used to produce porous bodies are binders, extrusion or forming aids, burnout agents, and liquids, typically water. Binders will help to hold the bodies together, and typically will include metal salts, oxides, and hydroxides, and their precursors and reaction products, the choice of which will depend upon the clay and other components present in the bodies. Preferred binders for use with kaolin-based particles are silica, silicic acid, alumina, and peptized alumina. The quantity of binders to be used will range from 0 to about 50%, and preferably from 0 to about 25%, of the total weight of the mixture used to form the porous bodies prior to the addition of any optional liquids.

Extrusion and forming aids, if used, will help to ease the process used to form the porous bodies, and may improve their green strength before calcination. Typical aids will include surfactants. A preferred extrusion aid is methyl cellulose. The quantity of optional extrusion aids to be used can range from 0 up to about 50%, and preferably up to about 25%, of the total weight of the mixture used to form the porous bodies prior to the addition of any optional liquids.

Finally, an optional liquid, if used, may aid forming of the bodies. It also may increase porosity by leaving voids within the bodies upon evaporation. A preferred liquid is water, although non-aqueous liquids may be useful in some circumstances. For example, in cases where the high surface tension of water leads to pore collapse on evaporation, lower surface tension organic liquids such as acetone may help to prevent a loss of porosity. The amount of optional liquid to be used will range from 0 to about 75% of the total weight of the ingredients used.

If the porous bodies are to be impregnated with one or more organic compounds (for conversion to activated carbon) after forming, then burnout agents may be added to the preparation mixture. Burnout agents may impart increased porosity or pores of alternate size to the porous bodies. Typical burnout agents include carbon and various natural and artificial polymers, such as starch and methyl cellulose. The quantity of the optional burnout agents to be used will range from 0 to about 50%, and preferably up to about 25% of the total weight of the mixture used to form the porous bodies prior to the addition of any optional liquids.

Useful methods for forming bodies include extrusion, pelletization, balling, and granulating, among others. After being formed, the bodies are dried and calcined. Drying will allow removal of any evaporable liquids from the bodies prior to their use, and may result in enhanced crush strength or physical integrity. Although any effective drying temperature may be used, preferred temperatures will range from room temperature to about 200° C.

Suitable calcination temperatures will depend upon the function to he fulfilled by the calcination step, and the conditions to which the bodies will he subject. Suitable temperatures for complete combustion of any organic materials in the bodies after forming will typically he in the range of 400°–700° C. For imparting greater strength to the bodies, a temperature which results in at least some sintering or vitrification of the clay and other ingredients will he necessary. Temperatures greater than about 400° C. should he suitable for this purpose.

The porous bodies of the current invention may find use in a number of applications, only some of which are enumerated here. Large pores in the body will allow biofilms of bacteria or other microorganisms to be supported within these pores: bacteria and other microorganisms are large, with typical dimensions on the order of 1 μm or greater, and thus will not fit in smaller pores. While biofilms will form on non-porous materials, the additional surface area which is available within the pores should foster larger populations of bacteria and other microorganisms. Further, living cells in pores will be protected from transient upsets in the external medium because diffusion into the pores will be relatively slow.

Additional benefits will accrue from the presence of zeolitic components in the porous bodies. Bacteria and other microorganisms are susceptible to acid and base shocks; the ability of the zeolites to buffer solutions will help to prevent excursions in pH, and thus prevent such shocks. The zeolites also may protect living cells by removing toxic heavy metal ions by ion exchange.

Zeolites, as taught by D. W. Breck and R. A. Anderson in Kirk-Othmer: Encyclopedia of Chemical Technology, Vol 15, Third Edition, are crystalline aluminosilicate molecular sieves comprising elements of group IA and IIA. Chemically they are represented by the empirical formula $M_{2/n}O \cdot Al_2O_3 \cdot ySiO_2 \cdot wH_2O$ where y is 2 or greater, n is the cation valence, and w represents the water contained in the voids of the zeolite. Zeolite framework structures are made up of linked $AlO_4$ and $SiO_4$ tetrahedra which form channels or interconnecting voids that are occupied by cations and water molecules. The cations are mobile and ordinarily undergo ion exchange.

As noted above, the particular ability of activated carbon to absorb organic molecules from aqueous solution will improve further the utility of porous supports for bacteria and other microorganisms. Activated carbon in the supports will adsorb wastes from a stream before a microbial population is established, or while one is being reestablished after a shock has killed all of the bacteria or other microorganisms present. Further, when wastes in an aqueous stream are too dilute to be affected by microbial metabolism, activated carbon can concentrate these wastes on the support so that they will be subject to degradation.

The activated carbon can be added in the form of powdered or granular activated carbon. Organic compounds which may be converted to activated carbon by charring include polyacrylonitrile, cellulose, lignin, methyl cellulose, coal, lignite, sawdust, peat, pitch and the like. When impregnating with a carbon containing compound and then converting to activated carbon, a preferred material is a water soluble carbohydrate.

Techniques for converting carbon compounds to activated carbon are disclosed by R. W. Soffel in "Carbon (Carbon and Artificial Graphite)" in the Kirk Othmer Encyclopedia of Chemical technology 3rd Edition, Vol. 4 1978 and by R. S. Joyce in "Carbon, Activated" in the Encyclopedia of Chemical Processing and Design 1978. These techniques involve pyrolyzing the material at 400°–500° C. and then oxidizing with steam, carbon dioxide or flue gas at 800°–1000° C. to develop porosity and surface area. Alternatively, a chemical treatment can be used to activate the carbon.

When the activated carbon is present as a cladding which covers the pore surfaces of the composite, then the support may have an additional advantage over carbon-free inorganic oxide supports. Specifically, some bacteria prefer to form biofilms on hydrophobic, rather than hydrophilic, surfaces. (Certain anaerobes useful in wastewater treatment fall into this category; see, for example, *Chemie-Ingenieur-Technik*, volume 63, pages 1238–1240, 1991.) These bacteria thus should colonize an oxide support which is coated with activated carbon much more readily than one which is not.

Activated carbon-inorganic oxide porous composites will be useful for supporting biofilms for a variety of applications. Chief among these is the biotreatment of aqueous waste streams. Additional uses may include chemical synthesis or any other applications in which living cells find use.

The large pores of the bodies also will make them useful as supports for conventional heterogenous catalysts because the rate of gaseous diffusion in pores increases with increasing pore diameter. Thus, in the case where intraparticle diffusion limits the rate of a catalyzed reaction, use of a support with the present large pores as is described herein will enhance the rate of product formation. For example, selective catalytic reduction of nitrogen oxides with vanadium-impregnated monolith catalysts is accelerated by the introduction of large pores to the monolith, as taught by Beeckman and Hegedus in "Design of Monolith Catalysts for Power Plant $NO_x$ Emission Control," in Industrial & Engineering Chemistry Research, Volume 29, pp. 969–978, 1991.

The large pores in the body will also allow large catalytic species to be supported within these pores. Of particular interest is the use of living cells, e.g., bacteria, as catalysts: bacteria are large, with dimensions on the order of 1 μm or greater, and thus will not fit in smaller pores. While bacteria will form colonies on non-porous materials, the additional surface area which is available within the pores should foster larger bacterial populations. Further, bacteria in pores will be protected from transient upsets in the external medium because diffusion into the pores will be relatively slow. This is particularly true of upsets characterized by a sudden high concentration of some compound which may be toxic to the bacteria or by sudden changes in pH, ionic strength or toxic concentration of an organic or inorganic component of a waste stream. Bacteria supported on porous supports also may be resistant to longer term upsets, such as temporary oxygen or nutrient starvation caused, for example, by equipment failures.

Bacteria immobilized on porous supports will have a variety of uses. This includes the biotreatment of aqueous waste streams, and the biofiltration of gases. Other uses include bioorganic synthesis of fine and commodity chemicals, and any other use for which bacteria are suitable. The supports have a catalytically effective amount of a microorganism. The microorganism can be a bacterium and examples include Pseudomonas, Acinetobacter, Mycobacterium, Corynebacterium, Arthrobacterium, Bacillus, Flavobacterium, Nocardia, Achromobacterium, Alcaligenes, Vibrio, Azotobacter, Beijerinckia, Xanthomonas, Nitrosomonas, Nitrobacter, Methylosinus, Methylococcus, Methylobacter and actinomycetes. The microorganism can also be fungi, yeast, algae or protozoans.

The porous supports can be used in the biotreatment of an aqueous waste stream or contaminated vapor as packing materials for bioreactors. Microorganisms with specialized metabolic capabilities can be used to colonize or adhere to the porous support and thus serve as biocatalyst for the decontamination of waste streams. The porous packing of the bioreactor increases the total surface area for high microbiological cell densities which results in chemical degradation rates much higher than those of conventional waste treatment systems. The bioreactor provides a means of controlling conditions which favor microbial degradation of target compounds. For example, parameters such as pH, oxygenation, nutrient concentrations, temperature, salinity, electron donors and co-metabolic substrates can be controlled. The bioreactor can be run under anaerobic and aerobic conditions. The waste stream can enter the base of the reactor such that the flow is upward or it can enter the top of the bioreactor and the waste stream can be directed downward. Thus, the bioreactor can function as an upflow or downflow fixed film system, or alternatively, the system can function as a fluidized bed reactor.

Nutrients and gases are introduced into the system to support the growth of the microorganisms and to thus catalyze the destruction of the contaminant. Waste streams which can be degraded by microorganisms according to the present invention include aromatics, hydrocarbons, halogenated organic compounds, phenolic compounds, alcohols, ketones, carboxylic acids, ammonia, nitrates, nitrogenous organic compounds, aldehydes, ethers, esters, organosulfur compounds, organophosphorus compounds and mixtures thereof.

When used for treating aqueous waste streams or contaminated vapors the catalyst of the present invention having a microbial colonization is resistant to process upsets such as acid upset, base upset, and nutrient limitation.

Additional benefits will accrue from the presence of zeolitic molecular sieve components in the porous bodies. Bacteria and other microorganisms are susceptible to acid and base shocks; the ability of the zeolites to buffer solutions will help to prevent excursions in pH, and thus prevent such shocks. The zeolites also may protect living cells by removing toxic heavy metal ions by ion exchange.

In addition to their utility as supports for biofilms and catalysts, the porous bodies of the current invention will be useful for adsorption of one or more components from gaseous or liquid mixtures, with enhanced diffusion rates giving them an advantage over conventional small-pore materials in gaseous mixtures. Further uses will include absorption of liquids and as carriers for reagents. In all of these applications, the bodies may be used without modification, or after treatment or impregnation with materials with the necessary properties.

Having described the basic aspects of our invention, the following examples are given to illustrate specific embodiments thereof.

EXAMPLE 1

This example illustrates the production of a composite support through the preparation of ⅛" diameter, 1:1 aspect ratio cylindrical clay extrudates with macropores in the 3–10 μm range, impregnation of the extrudates with a sucrose solution, and calcination of the impregnated extrudates to convert the sucrose to activated carbon.

Nitric acid solution (34.3 lbs of 70 wt % nitric acid and 570.0 lbs. of water) and Catapal B alumina (195.0 lbs equivalent to 136.5 lbs on an anhydrous basis) were blended in a 300 gallon Sigma mixer to form a homogeneous gel. While the mixer was running, Davison Super DC (941.0 lbs USY zeolite containing fluid catalytic cracking catalyst) was added to the gel, and the resulting mixture was again blended to homogeneity (about 10 minutes). After addition of methylcellulose (Dow Methocel 20-213, 46.9 lbs) and an additional 10 minutes of blending, the mixture was extruded with a 2" Welding extruder to form ⅛" pellets. These were air-dried overnight, then calcined at 550° C. for 4 hours. The product had a total pore volume (by mercury porosimetry) of 0.523 cc/cc, of which 0.304 cc/cc was in pores of 1000 Angstrom or greater diameter. The distribution of the 1000+Angstrom pores peaked at a diameter of 3–9 μm. Average crush strength was 7.4 psi.

In a teflon coated rotating beaker, 1500 g of the above calcined ⅛" pellets were pore filled to incipient wetness with a saturated sucrose solution containing 1200 g sucrose and 600 g distilled water. The material was dried in a convection oven over night at 100° C. followed by calcination in a covered quartz tray at 400° C. for 2 hrs.

EXAMPLE 2

This example demonstrates the adsorptive capacities of various extrudates for phenol as compared to granular activated carbon.

Ten grams of each extrudate was rinsed in MilliQ water, soaked overnight and then dried in an oven. Five grams (dry weight) of each extrudate was added to 125 ml glass serum bottles. Fifty millimeters of a 250 ppm phenol solution (or 12.5 mg total phenol) was added to each bottle; the bottle was capped and agitated at 80 rpm at ambient temperature. After 24 hours, an aliquot was removed and phenol concentration was determined by high pressure liquid chromatography (HPLC). The solution from each flask was then aspirated and an additional solution of phenol was added as before. This process was repeated until the extrudates were saturated.

The adsorption of phenol by various extrudates after a 24 hour incubation period is shown in the following table.

TABLE 1

| Extrudate | Initial conc (mg)[a] | Final conc (mg)[a] | % Adsorption |
| --- | --- | --- | --- |
| Zeolite | 11.7 | 11.6 | <0.9 |
| Carbonized zeolite | 11.7 | 10.35 | 11.5 |
| Carbon-Zeolite composite[b] | 11.7 | 2.05 | 82.5 |

TABLE 1-continued

| Extrudate | Initial conc (mg)[a] | Final conc (mg)[a] | % Adsorption |
|---|---|---|---|
| GAC | 11.7 | 0.05 | 99.6 |

[a]Total concentration of phenol in the aqueous phase as determined by HPLC
[b]See Example 5

The zeolite extrudate control did not adsorb phenol whereas the carbonized zeolite adsorbed 0.88 mg of phenol per gram of carrier at saturation. By comparison a carbon-zeolite composite extrudate (described in Example adsorbed 3.2 mg of phenol per gram and GAC adsorbed 114 mg per gram.

EXAMPLE 3

This example illustrates the performance of bioreactors of cylindrical extrudates colonized with bacteria for the degradation of phenol.

A culture of phenol-grown Pseudomonas aeruginosa was pumped continuously through a 2.1 liter Kontes glass column packed with various carriers until substantial biomass was evident on the extrudates. The colonized bioreactor then received an influent stream of phenol and 120 ppm P and 250 ppm N. Microorganisms in the head space of the column were recycled through the system at a 12:1 recycle ratio.

Degradation of a 900 ppm phenol waste stream was monitored in bioreactors containing P. aeruginosa colonized onto the following carriers: ⅛-inch zeolite, ⅛-inch carbonized zeolite as made in Example 1, flexirings (plastic) and diatomaceous earth (DE: Sumitomo). Reactor efficiencies (mg/L.h degradation) for a 30 day period are summarized as follows:

TABLE 2

| | Phenol Degradation Rate (mg/1.h) for | | | |
|---|---|---|---|---|
| | Zeolite | Carbonized Zeolite | DE | Flexiring |
| Mean | 4.34 | 5.17 | 3.34 | 0.86 |
| St. Dev | 0.88 | 0.37 | 0.65 | 0.36 |
| n | 14 | 14 | 13 | 13 |

The bioreactor containing carbonized zeolite extrudates performed moderately better than the zeolite reactor. Each of the aforementioned reactors were more efficient degrading phenol than the DE-reactor, and the reactor containing plastic packing (flexirings).

EXAMPLE 4

This example illustrates the acid shock resistance of packed column bioreactors of cylindrical zeolite extrudates and carbonized zeolite extrudates compared to DE and flexirings.

In a manner similar to Example 3, bioreactors containing each carrier received a common medium containing 120 ppm P, 250 ppm N and 900 ppm phenol (effluent pH 5.5 to 5.8). The medium was acidified with 18 mM sulfuric acid and each reactor received this acidified feed for a period of eight hours, after which, the reactor's influent feed medium was converted to the original medium. Effluent from each reactor was monitored for phenol removal and pH.

Figure 1A:
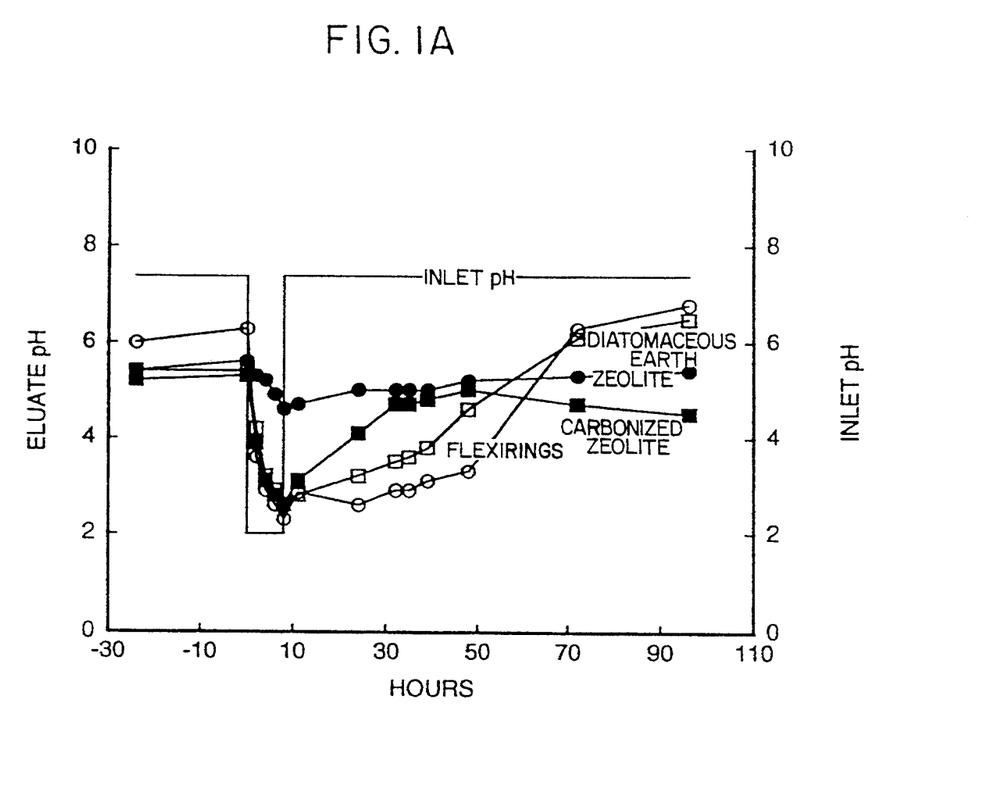
FIG. 1A illustrates the phenol degradation effect of acid treatment of bioreactors containing microorganisms immobilized onto various carriers.
Figure 1B:
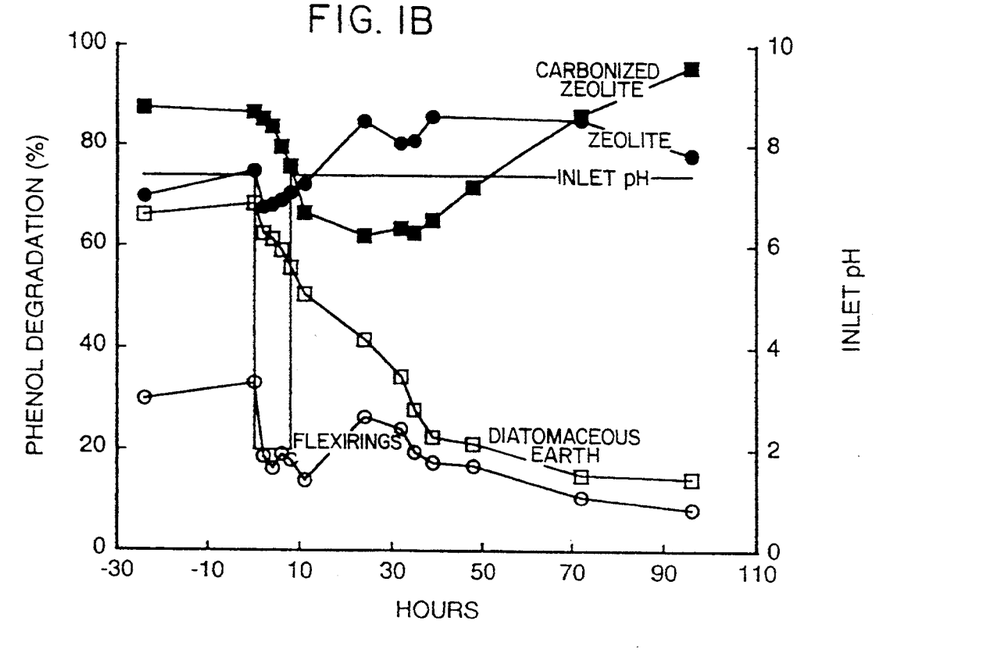
FIG. 1 illustrates the effluent pH of acid treated bioreactors containing microorganisms immobilized onto various carriers during a drop inlet feed pH to 2 for 10 hours.
Figure 2A:
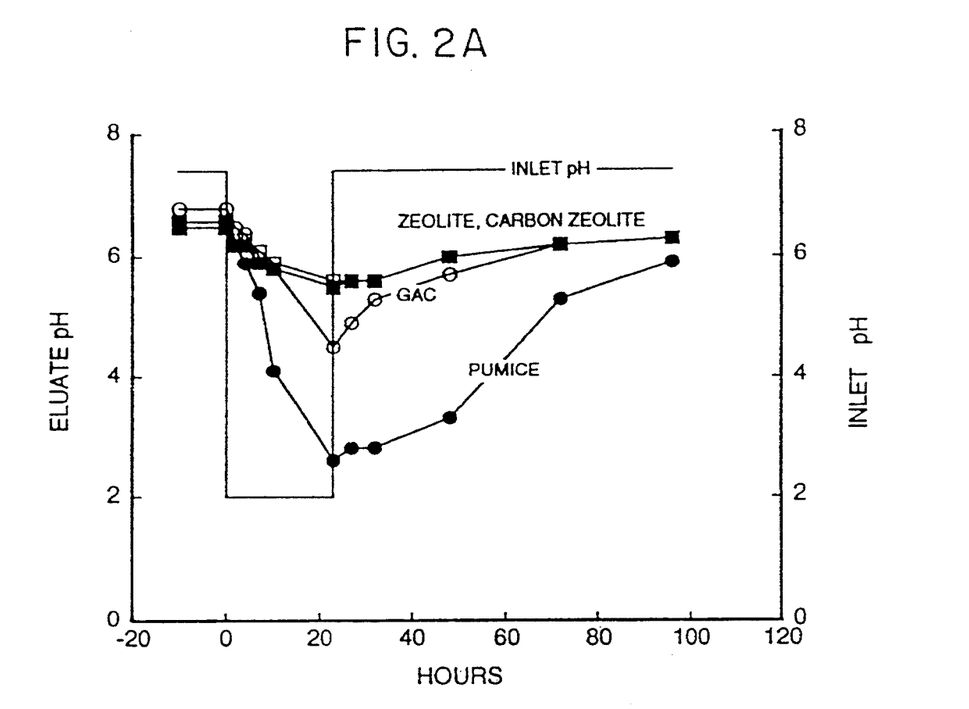
FIG. 2A illustrates the phenol degradation effect of acid treatment of bioreactors containing microorganisms immobilized onto various carriers.
Figure 2B:
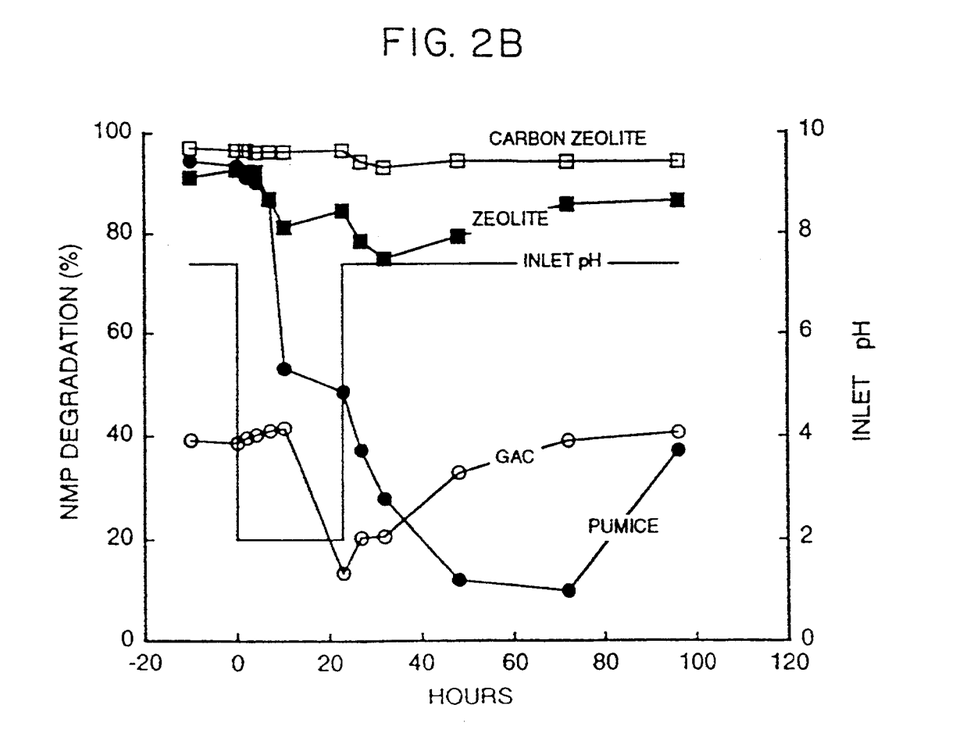
FIG. 2 illustrates the effluent pH of acid treated bioreactors containing microorganisms immobilized onto various carriers during a drop in inlet feed pH to 2 for 24 hours.

The results are shown in FIGS. 1 and 1A. The carbonized zeolite did not exhibit the buffering capacity observed with the zeolite. Although, the effluent pH dropped to pH 2.7 for the reactor containing carbonized zeolite, phenol removal only declined to 62% and recovery to the initial removal rate occurred rapidly. By comparison, bioreactors containing either DE or flexiring packing exhibited a decrease in eluate pH to between 2.2 and 2.6 and phenol removal decreased to less than 20%. Recovery of reactor efficiencies did not occur as the pH of the bioreactors returned to the initial pH values.

EXAMPLE 5

This example illustrates the production of a composite support through the preparation of ⅛" diameter, 1:1 aspect ratio cylindrical clay extrudates containing granular activated carbon with macropores in the 3-10 μm range.

Nitric acid solution (34.3 lbs of 70 wt % nitric acid and 570.0 lbs of water) and Catapal B alumina (195.0 lbs equivalent to 136.5 lbs on an anhydrous basis) were blended in a 300 gallon Sigma mixer to form a homogeneous gel. While the mixture was running, Davison Super DC (941.0 lbs of USY zeolite containing fluid catalytic cracking catalyst) was added to the gel, and the resulting mixture was again blended to homogeneity (about 10 minutes). Methocel 20-213 (46.9 lbs) was then added followed by an additional 10 minutes of blending.

In small 5 gallon Sigma mixer 1.1 lbs of Calgon granular activated carbon (Type F-300, 8×30 mesh) was added to 10.0 lbs of the above extrusion paste and blended until homogeneous. After 1 lb of water was added, followed by 10 minutes of blending, the mixture was extruded with a 2" Welding extruder to form ⅛" pellets. The pellets were dried in a convection oven at 140° F. overnight and calcined in a covered quartz tray at 550° C. for 2 hrs. Wt % carbon was 8.04 ±/−.86%. Porosity by Mercury Porosimetry was 0.516 cc/cc totals 0.287 cc/cc greater than 1000 Angstroms. The distribution of 1000+Angstrom pores peaked at 4-6 μm. Average crush strength was 5.3 psi.

EXAMPLE 6

This example illustrates the adsorptive capacities of various extrudates for N-methylpyrrolidone (NMP) as compared to granular activated carbon.

Extrudates were washed, dried and added to serum vials as described in Example 2. Fifty milliliters of a 500 ppm solution of NMP (or 250 mg) was added to each flask. The flasks were stoppered and the experiment was performed exactly as described in Example 2.

The adsorption of NMP by the various extrudates after a 24 hour incubation period is shown in the following table.

TABLE 3

| Extrudate | Initial conc (mg)[a] | Final conc (mg)[a] | % Adsorption |
|---|---|---|---|
| Zeolite | 241 | 237 | 2 |
| Carbon-Zeolite composite | 241 | 76 | 32 |
| GAC | 241 | 9 | 96 |

[a]Total initial and final concentrations of NMP in the liquid phase as determined by HPLC.

The zeolite carrier exhibited nominal adsorption of NMP, whereas the carbon-zeolite composite initially adsorbed 32% of NMP added. The composite extrudate was saturated after the first addition, thus adsorbing 15 mg of NMP per gram of extrudate. By comparison, the flask containing GAC underwent six volume changes and adsorbed a total of 114 mg of NMP per gram of GAC.

EXAMPLE 7

This example illustrates the performance of bioreactors of cylindrical extrudates colonized with bacteria for the degradation of N-methylpyrrolidone (NMP).

Cultures of NMP-grown *Pseudomonas putida* were pumped continuously through a 2.1 liter Kontes glass column packed with various carriers until substantial biomass was evident. The colonized bioreactors then received an influent stream of NMP (4000 ppm)and nutrients as in Example 3. Microorganisms in the head space of the column were recycled through the system at a 12:1 recycle ratio. Oxygen required for NMP dissimilation was introduced through the recycle line at the base of the column.

Bioreactors contained granular activated carbon (GAC: Calgon), pumice, zeolite carrier or carbon/zeolite composite carrier as described in Example 5 were used for comparison. The degradation rate of (mg/l.h) of a 4000 ppm waste stream of NMP over a 30-day period for these bioreactors is summarized as follows:

TABLE 4

| | NMP Degradation Rate (mg/l.h) for: | | | |
|---|---|---|---|---|
| | GAC | Zeolite | Carbon/Zeolite | Pumice |
| Mean | 65.2 | 88.3 | 85.2 | 84.2 |
| St. Dev. | 10.3 | 8.3 | 8.0 | 13.5 |
| n | 14 | 14 | 14 | 14 |

Under these conditions, comparable performance was observed with bioreactors containing either zeolite, carbon/zeolite composite and pumice; each of these reactors were more proficient removing NMP than the bioreactor containing GAC.

EXAMPLE 8

This example illustrates the acid shock resistance of bioreactors of cylindrical zeolite extrudates, carbon-zeolite composite extrudates, pumice and GAC colonized with bacteria for the degradation of NMP.

In a manner similar to Example 4, bioreactors, containing either ⅛-inch zeolite carrier, ⅛-inch carbon-zeolite composite carrier, pumice and activated carbon carrier, received a medium containing 120 ppm P, 250 ppm N and 1500 ppm NMP (pH 7.0); NMP degradation was >90% for the reactors containing zeolite or carbon-zeolite composite extrudates and pumice. The GAC reactor was degrading 40% of the influent NMP. The medium was acidified with 40 mM sulfuric acid and each reactor received this acidified feed for 24 hours after which the reactor's influent feed medium was converted to the original medium. Effluent from each reactor was monitored for NMP degradation and pH.

The results of this experiment are shown in FIGS. 1 and 1A. The pH of the GAC reactor declined to 4.5 at hour 23 and recovered to pH 6.0 at hour 72 or 49 hours after receiving neutralized NMP waste stream. During this period the degradation of NMP decreased from 40% to 14% and degradation recovered to 40% at hour 96.

By comparison, bioreactors containing either zeolite or carbon-zeolite extrudate demonstrated a modest decrease in effluent pH (pH 5.5). The degradation of NMP decreased from 93% to 75% for the zeolite reactor at hour 32 but recovered to >85% at hour 72. Significantly, the carbon-zeolite bioreactor experienced a similar, moderate decrease in effluent pH, but the degradation of NMP remained constant. These results indicate that the carbon-zeolite extrudates provide a superior matrix for microbial decomposition of wastes during acid upsets as compared to either the zeolite or an activated carbon carrier.

The control bioreactor for this experiment, containing the non-adsorptive pumice, demonstrated a dramatic drop in pH and degradation.

It is understood that the foregoing detailed description is given merely by way of illustration, and that many variations may be made therein without departing from the spirit of this invention.

What is claimed is:

1. A macroporous inorganic oxide catalyst support having improved adsorption properties, said support comprising
   (1) a plurality of
      (a) inorganic oxide particles having a diameter of 1 to 1000 microns with a Davison Index of less than 20 and
      (b) activated carbon particles; and
   (2) an inorganic binder which binds said inorganic oxide and carbon particles together in a manner such that macropores are formed throughout the catalyst support, said catalyst support having a total pore volume of 0.1 to 1.5 cc/g; macropores with pore diameters as measured by mercury porosimetry of from about 0.5 to 100 microns, said macropores providing a pore volume of from about 0.1 to 1.0 cc/g; and a crush resistance of greater than 5 pounds when measured on supports having a minimum dimension of 1 mm.

2. An inorganic oxide catalyst support according to claim 1, wherein the activated carbon particles are dispersed throughout the support.

3. An inorganic oxide catalyst support according to claim 1, wherein the activated carbon particles are present as a surface coating on the inorganic oxide particles of a previously formed support.

4. An inorganic oxide catalyst support according to claim 1, wherein the inorganic oxide particles comprise at least one zeolite particle.

5. An inorganic oxide catalyst support according to claim 4, wherein the inorganic oxide particles further comprise clay particles.

6. An inorganic oxide catalyst support according to claim 5 or 1, wherein the inorganic oxide particles comprise a plurality of inorganic oxide particles bonded together with an inorganic binder, and wherein the inorganic binder is selected from silica, silicic acid, alumina, a hydrated alumina, or aluminum chlorhydrol.

7. An inorganic oxide catalyst support according to claim 5 or 1, wherein the inorganic binder is a metal salt, metal hydroxide, or metal oxide.

8. An inorganic oxide catalyst support according to claim 5 or 1, wherein the macropores provide a pore volume from about 0.15 to 0.6 cc/g.

9. The inorganic oxide catalyst support according to claim 5 or 1, wherein the support is formed by spray drying a slurried mixture comprising inorganic oxide particles and inorganic binder and forming the mixture into a desired shape.

* * * * *